Jan. 26, 1937. E. W. RICHTER Re. 20,253
CONTROL PEDAL
Original Filed Dec. 16, 1931
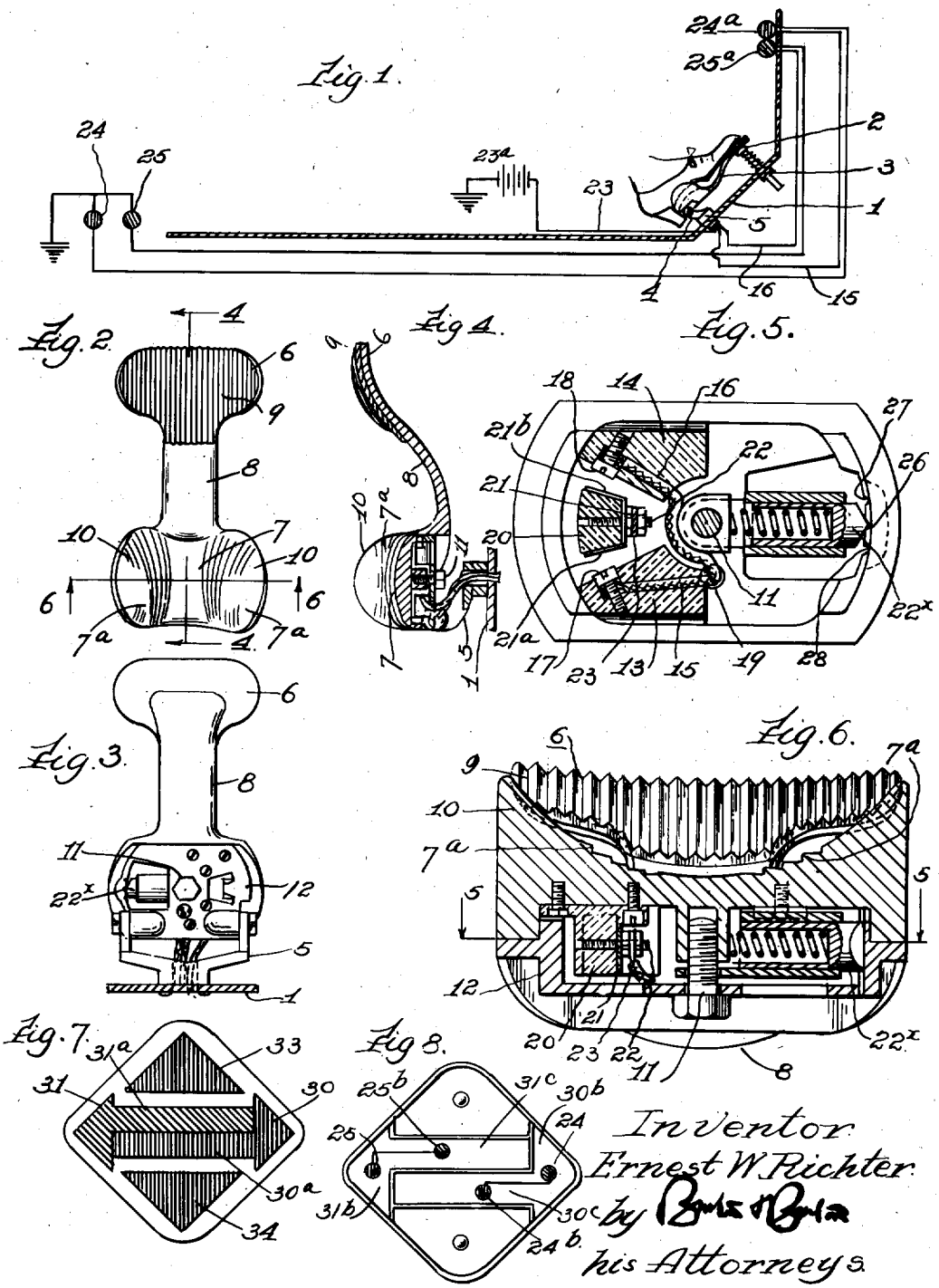

Reissued Jan. 26, 1937

Re. 20,253

UNITED STATES PATENT OFFICE 20,253

CONTROL PEDAL

Ernest W. Richter, Chicago, Ill.

Original No. 2,040,672, dated May 12, 1936, Serial No. 581,407, December 16, 1931. Application for reissue November 2, 1936, Serial No. 108,840

10 Claims. (Cl. 200—59)

This invention relates to control pedals and it is illustrated herein as applied to direction signals of the type carried by road vehicles, such as automobiles and motor trucks, for advising other drivers on the road when the vehicle is about to make a turn. The object of the invention is to provide a control pedal adapted to perform a plurality of functions; when used for operating such signals, it can be manipulated by the driver without detracting his attention from his handling of the vehicle, or interfering with his normal manipulation of the vehicle controls. It consists in certain features and elements of construction in combination as herein shown and described, and as indicated by the claims.

In the drawing:

Figure 1 is a diagrammatic side elevation of a control pedal embodying this invention, showing it installed upon the floor board of a motor vehicle, together with a wiring diagram of a signal system.

Figure 2 is a top plan view of the pedal member.

Figure 3 is a bottom plan view of the pedal and its supporting fulcrum bracket showing the pedal swung upwardly from its normal operating position.

Figure 4 is a longitudinal section taken as indicated at line 4—4 on Figure 2.

Figure 5 is a plan section of the contact devices, and detent, being taken substantially as indicated at line 5—5 on Figure 6.

Figure 6 is a transverse vertical section through the pedal, taken as indicated at line 6—6 on Figure 2.

Figure 7 is a face view or elevation of a direction signal lamp casing suitable for use as a part of this invention.

Figure 8 is an interior view of the signal lamp casing.

Many attempts have been made to provide a motor vehicle with means for signaling the drivers of other vehicles on the road to advise them of the intention of the driver with a view to avoiding collisions and other accidents, but most of these devices depended upon the manipulation of a control switch or handle requiring the driver to take at least one hand from the wheel, often at just the moment when it was both inconvenient and dangerous to do so. Other devices have been designed with control members associated with the clutch or brake pedal, but always in such a way as to interfere to some extent with the operation of these parts, either or both of which must usually be actuated when the vehicle makes a turn. My device is in the nature of an electric switch mechanism, and is associated with the usual foot throttle or accelerator button which is the practically universal member provided for controlling engine speed on motor vehicles using an internal combustion engine. The particular form of signal to be embodied as a part of my system may vary, as desired; that is, it may consist of a plurality of electric lights which may be caused to glow selectively, or it may consist of mechanically moving arms in the nature of semaphores, electrically operated, and controlled from the switch device which is the essential feature of my invention.

Referring first to Figure 1, the sloping portion of the foot-board is shown at 1, with the usual plunger type accelerator button at 2; its mechanical connections to the throttle are not shown. The button, 2, may be operated directly by one foot of the driver, but quite frequently a hinged pedal is mounted on the floor board with its free end overlying the button, 2, to facilitate its operation. For the purpose of my invention I provide a special pedal member, 3, fulcrumed at 4, on a bracket, 5, which is secured in any convenient manner to the foot-board, 1. The pedal member itself consists of a toe plate section, 6, an arch-supporting member, 7, and a bar, 8, connecting them. The toe plate is preferably made slightly concave on its upper side and may be surfaced with a pad of corrugated rubber, indicated at 9, and preferably having corrugations which extend longitudinally of the pedal, as shown. The arch support, 7, is convex in longitudinal section in order to fit up approximately under the arch of the shoe, and is concave in transverse section, as indicated in Figure 6, so that its upwardly trending lateral portions, 10, will to some extent, hug the sides of the foot. This engagement of the foot by the portions, 10, and the frictional engagement of the toe or sole of the shoe with the corrugated surface at 9, permit the operator to swing the pedal bodily through a limited arc in either direction about the axis of a pivot bolt, 11, by which the pedal member is attached to its base portion, 12, which, in turn, is connected to the fulcrum bracket, 5, for the vertical swinging movement of the pedal which operates the accelerator or throttle button, 2.

Carried by the base section, 12, are blocks of insulating material at 13 and 14 through which lead wires, 15 and 16, extend respectively from contact screws, 17 and 18, and emerge from the base, 12, through an opening, 19, from which they pass through an opening in the base of the bracket, 5, and in the floor board, 1, for connection with the signal system, as indicated in the wiring diagram embodied in Figure 1. The movable pedal member which includes the arch-supporting section, 7, carries on its under face a block of insulating material, 20, with a metallic contact strip, 21, secured thereto and associated with the binding screw, 22, to which a battery wire, 23, is connected. One face, 21[a], of the contact strip is positioned opposite the head of the contact screw, 17, and another face, 21[b], is disposed opposite the head of the screw, 18. In the normal straight-ahead position of the pedal member there is a clearance space between these contact faces and both of the screws, 17 and 18, and the parts are retained in this position by a spring detent plunger, 22[x], engaging a central notch or recess, 26, in the side wall of the base member, 12. The plunger itself is carried by the swinging pedal member so as to be disengaged from the notches, 27, 28, when the pedal is swung to one side or the other.

As indicated in the wiring diagram of Figure 1, the direction signal device may consist of two differently colored lamps, 24 and 25, one for indicating an intended turn to the right, and the other for indicating a turn to the left. Such lamps will be carried ordinarily at the rear of the vehicle, and, if desired, the electric circuits for the lamp may include tell-tale lights, 24[a] and 25[a], wired in series with the signal lamps respectively, and mounted on the dashboard or otherwise conveniently in view of the driver so that he may know definitely at all times whether or not the signal lamps are functioning properly. When the driver wishes to indicate his intention to make a turn, he will swing the toe of his foot slightly to one side or the other from its normal straight-ahead position so as to swing the pedal member bodily about the pivot, 11. This will bring one of the contact screws, 17 or 18, into engagement with the corresponding face of the contact strip, 21, thus connecting one of the signal lights, 24 or 25, in the circuit with the battery, 23[a], to which the wire, 23, leads. It may be understood that one contact of each lamp is grounded on the frame of the car, as indicated in the wiring diagram, and that, similarly, one terminal of the battery is so grounded. The under surface of the toe plate, 6, is substantially flat at its middle portion so that throughout the range of lateral swing of the pedal upon its pivot, 11, this movement will not alter the vertical position of the throttle button, 2, over which the toe plate, 6, slides in this swinging movement. The operator may maintain his foot pressure upon the throttle button, 2, and thus hold it at a given adjustment independently of the lateral swinging movement of the foot which operates the direction signal, or if simultaneously he wishes to alter the speed of the vehicle, he may do so by shifting the throttle button, 2, up or down.

If it should become necessary to make a quick stop, or apply the brake, the driver may take his foot off the pedal, 3, entirely, for operating the brake pedal, and the detent plunger, 22, will hold the contact strip, 21, in engagement with the screw, 17, or the screw, 18, by virtue of the provision of supplemental notches, 27 and 28, in the wall of the part, 12, which the point of the plunger traverses when the pedal is swung about the pivot, 11. This avoids any uncertainty in the interpretation of the signal which might result if removing the foot from the pedal, 3, permitted it to return automatically to its middle or neutral position.

In designing the pedal member, 3, I have endeavored to shape it so that it shall be adapted to fit a wide range of shapes and sizes of shoes, both men's and women's. The cradle-like concave cross-section of the arch-supporting member or saddle, 7, as indicated in Figure 6, is wide enough to receive a large man's shoe, but concave enough to engage the edges of the relatively small women's shoe, and, preferably, the upwardly curving portions, 7[a], are longitudinally corrugated to assist such engagement if the flanges, 10, should be too widely spaced to fit the sides of the foot. I have also made the connecting bar, 8, with a quite deeply depressed portion adjacent the arch support, 7, to allow for the relatively high arch of a woman's shoe so as to insure that the pressure of the foot employed for swinging the pedal, 3, laterally about the pivot, 11, shall be concentrated upon the rubber shod toe plate, 6, at a considerable distance from the pivot, 11, thus insuring easy action by ample leverage, and avoiding the possibility of slippage of the foot which might occur if the sole of the shoe should contact with the bar, 8, instead of with the toe plate.

Figure 7 shows one style of signal lamp casing suitable for use in a device of this character. The middle portion of the casing includes a double-pointed horizontal arrow design, one arrow head, 30, being indicated as of one color, and the other arrow head, 31, being shown in a different color. A shaft portion, 31[a], of the same color as the arrow head, 31, extends alongside a similar shaft portion, 30[a], which is of the same color as the head, 30. From a consideration of the interior of the casing shown in Figure 8, it will be seen that the space, 30[b], back of the arrow head, 30, communicates with the space, 30[c], back of the shaft, 30[a], but that these spaces are partitioned from the spaces, 31[b] and 31[c], corresponding to the outlines of the other arrow. A single lamp, 24, may be sufficient to illuminate both the arrow head, 30, and its shaft, 30[a], but, if desired, a supplemental lamp may be included in the circuit at 24[b]. Likewise, two lamps, 25 and 25[b], may be employed for the other arrow. As shown in Figure 7, the casing design includes an upper triangle, 33, and a lower triangle, 34. One of these may be understood to be intended for use as a stop-light signal, and the other as the usual continuously burning tail-light.

There is a special advantage in providing two lamps, 24 and 24[b], for illuminating one of the arrow-shaped signals, and two lamps, 25 and 25[b], for the other arrow if each pair of lamps is connected in parallel. With this arrangement, if either lamp burns out, the other will illuminate the signal fairly well, whereas otherwise it would be entirely inoperative until the driver could take time to renew the burned-out lamp.

It will be seen that I have provided a device which may be used to actuate a direction signal without interfering with the convenience of the driver, or with his safe operation of the vehicle controls, and which may be easily applied to most existing motor vehicles without alteration of any other essential part.

While there is shown and described herein certain specific structure embodying the invention, it will be manifest to those skilled in the art that various modifications and rearrangements of the parts may be made without departing from the spirit and the scope of the invention, and that the same is not limited to the particular form herein shown and described, except in so far as indicated by the appended claims.

I claim:

1. A control pedal including a lower part fulcrumed horizontally at the rear end for rocking in a fore-and-aft vertical plane and an upper part formed to support the foot of the operator and pivoted to the lower part for bodily turning movement thereon independently of said rocking movement about an axis approximately perpendicular to the general plane of its foot-supporting area and closely proximate to the rear end fulcrum of the lower part; said upper part including a saddle portion adjacent said rear end fulcrum shaped to fit under the arch of the operator's shoe and having laterally upstanding flanges whereby the operator's foot is engaged with said pivoted upper pedal part for effecting the turning movement about its pivot.

2. In the combination defined in claim 1, the flange portions of said saddle being formed with their opposing faces inclined divergently upward for accommodating shoes of different widths.

3. A control pedal including a lower part fulcrumed horizontally at the rear end for rocking in a fore-and-aft vertical plane, and an upper part formed to support the foot of the operator and pivoted to the lower part for bodily turning movement thereon independently of said rocking movement about an axis approximately perpendicular to the general plane of its foot-supporting area and closely proximate to the rear end fulcrum of the lower part for adjustment of the upper part right and left about its pivot, said upper and lower parts having mutually engageable detent features positioned on said parts respectively for registration and engagement with each other at predetermined points in the right-and-left adjustment of the upper part, one of said cooperating features being spring-actuated for effecting such engagement automatically.

4. In the combination defined in claim 1, a pair of electrical contacts carried by one of said pedal parts and spaced apart laterally and at a distance from said perpendicular pivot axis, and a third contact element fixed to the other part in position to be engaged with the others alternatively by the turning movement of the upper pedal part.

5. In the combination defined in claim 1, a pair of electrical contacts carried by one of said pedal parts and spaced apart laterally and at a distance from said perpendicular pivot axis, and a third contact element fixed to the other part in position to be engaged with the others alternatively by the turning movement of the upper pedal part; said upper and lower parts having mutually engageable spring detent features positioned respectively for registration and engagement at the positions of turning movement of the upper pedal part at which said contacts are engaged and also at an intermediate middle position.

6. In the combination defined in claim 1, said saddle of the upper part having its lateral flanges connected by a transversely concave surface which is convex in longitudinal vertical section and said upper part including a toe-plate extending forwardly from the saddle portion for engagement with the sole of the operator's shoe.

7. A control pedal including an upper part formed to support the foot of the operator and a lower part to which the upper part is pivoted for bodily turning movement about an axis approximately perpendicular to the general plane of the foot-supporting area of said upper part, the pedal being fulcrumed horizontally adjacent its rear end for rocking in a fore-and-aft vertical plane at an axis closely proximate to that at which the upper part is pivoted for its bodily turning movement, a pair of electrical contacts carried by one of said pedal parts and spaced from each other, and a third contact element carried by the other part in position to be engaged with the others alternatively by the turning movement of the upper pedal part about said perpendicular axis.

8. A control pedal including an upper part formed to support the foot of the operator and a lower part to which the upper part is pivoted for bodily turning movement about an axis approximately perpendicular to the general plane of the foot-supporting area of said upper part, the pedal being fulcrumed horizontally adjacent its rear end for rocking in a fore-and-aft vertical plane at an axis closely proximate to that at which the upper part is pivoted for its bodily turning movement, said upper and lower parts having mutually engageable detent features positioned respectively for registration and engagement with each other at predetermined points in the bodily turning movement of said upper part about said perpendicular pivot axis, one of said detent features being spring-actuated for effecting such engagement automatically to retain the pedal at each adjusted position.

9. A control pedal including an upper part formed to support the foot of the operator and a lower part to which the upper part is pivoted for bodily turning movement about an axis approximately perpendicular to the general plane of the foot-supporting area of said upper part, the pedal being fulcrumed horizontally adjacent its rear end for rocking in a fore-and-aft vertical plane at an axis closely proximate to that at which the upper part is pivoted for its bodily turning movement, a pair of electrical contacts carried by one of said pedal parts and spaced from each other, and a third contact element carried by the other part in position to be engaged with the others alternatively by the turning movement of the upper pedal part about said perpendicular axis, together with spring detent means by which said upper part is normally held at an intermediate position in its range of bodily turning movement with said third contact element disengaged from both of the other contacts.

10. A control pedal including an upper part formed to support the foot of the operator and a lower part to which the upper part is pivoted for bodily turning movement about an axis approximately perpendicular to the general plane of the foot-supporting area of said upper part, the pedal being fulcrumed horizontally adjacent its rear end for rocking in a fore-and-aft vertical plane at an axis closely proximate to that at which the upper part is pivoted for its bodily turning movement, a pair of electrical contacts carried by one of said pedal parts and spaced from each other, and a third contact element carried by the other part in position to be engaged with the others alternatively by the turning movement of the upper pedal part about said perpendicular axis, together with spring detent means by which said upper part is automatically held when said third contact is engaged with either of said pair of contacts.

ERNEST W. RICHTER.